INVENTORS.
Antonin Rokos
BY Jaroslav Matějka
(signature)

INVENTORS.
Antonín Rokos
BY Jaroslav Matějka
Richard Lowe
Ag't

INVENTORS.
Antonín Rokos
Jaroslav Matějka
Richard Low
Agt

United States Patent Office 3,380,032
Patented Apr. 23, 1968

3,380,032

STORAGE AND LOGIC NETWORKS

Antonin Rokos, Prague, and Jaroslav Matejka, Rakovnik, Czechoslovakia, assignors to Vyzkumny ustav matematickych stroju, Prague, Czechoslovakia Filed Aug. 13, 1965, Ser. No. 479,463
10 Claims. (Cl. 340—172.5)

ABSTRACT OF THE DISCLOSURE

Storage circuits have an input connection to record information signals applied thereto, a non-destructive readout connection to deliver information stored therein, and an interrogation input connection effective to obtain an output at the readout connection and to cause re-storage of the information in the storage circuit. A dual storage combiner includes a first coincidence stage which combines the outputs from the readout connections of the storage circuits of the same weight to form a composite output. The dual stage combiner includes a second coincidence stage which combines the composite outputs to a single output signal.

Figure 1:
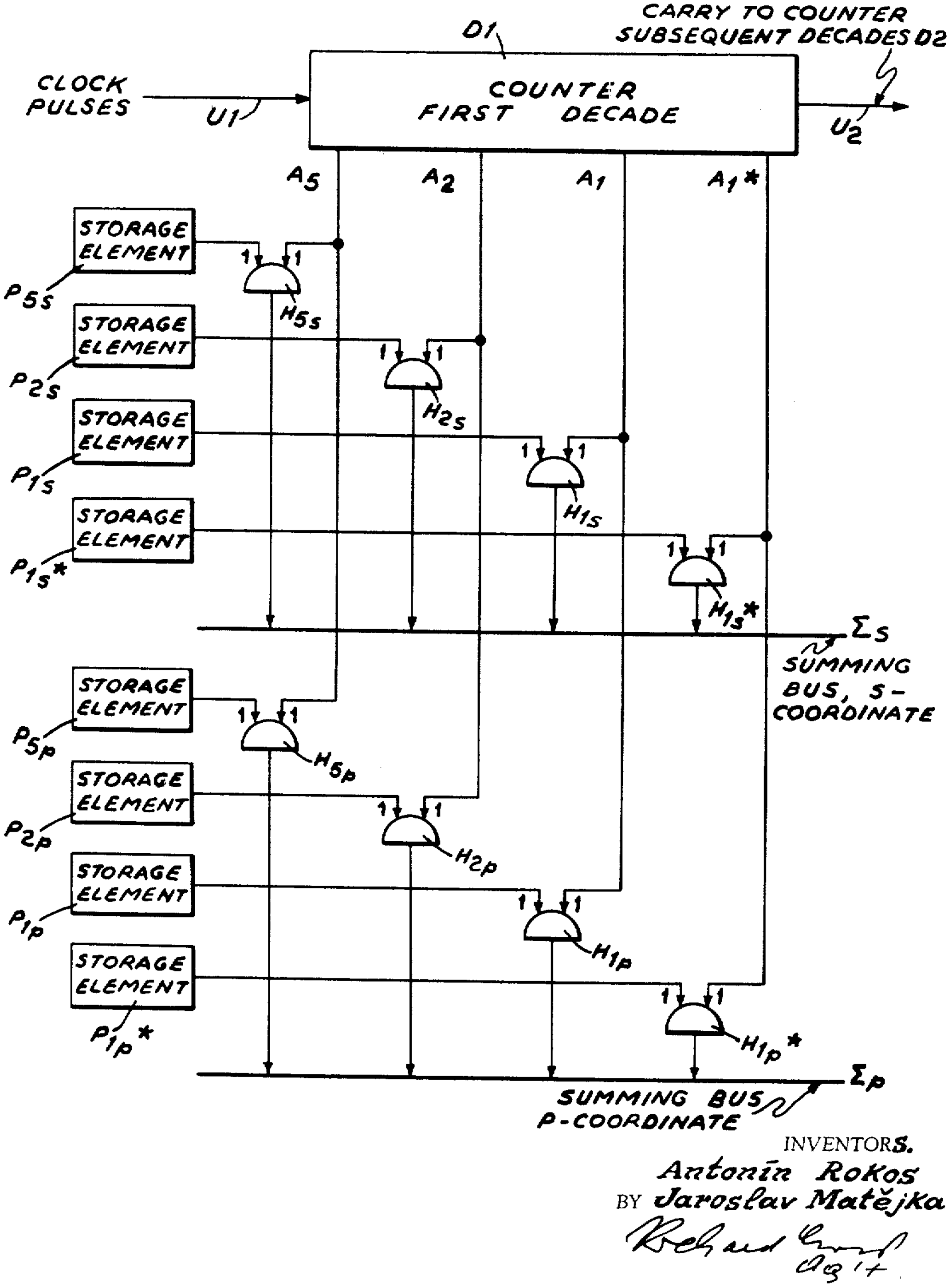

The present invention relates to storage and logic networks for the selection of impulses using linear interpolation, and more particularly to storage and logic networks for use with program control apparatus for machine tools.

The choice of clock impulses for linear interpolation is one of the problems that has to be solved when constructing machine tool control systems. Known methods to select clock impulses use binary, or decimal counters which are so connected, that in the course of one cycle, clock impulses are obtained from the outputs which have a predetermined suitable weight, or density. Such systems utilize usually storage elements which operate gates, which connect the appropriate counter outputs to summing circuits, depending upon the desired number of pulses in accordance with the information of the program.

It is an object of the present invention to provide a simplified combined storage and logic network for use in such systems.

In accordance with the present invention, substantial savings in equipment can be achieved by combining the function of the storage element and the gate circuits in a single, suitably arranged storage element and network, such that the information can be received thereby, retained so long as desired, and released and read out upon command at any time. The readout is non-destructive so that the information placed in the storage element is not destroyed. When such storage elements and networks are placed in the output circuits of counters of the interpolation stage, then the signals in the output circuits of the counters can be used to cause reading of the information. Of course, a signal will be given by the storage element and network to the summing circuit only when information is contained therein.

A storage element and network, to be used in accordance with the present invention, must have at least three inputs. One input must be for the registration signal, which carries the information; another input must be provided to cause reading of the information contained in the storage element, without causing destruction of the information therein; and the third input must be reset, or null input, which sets the entire memory and logic network back to zero, or, in other words, causes erasing of any information contained therein.

The storage and logic network is divided into storage circuits having an input connected to record information signals applied thereto, a non-destructive readout connection to deliver information stored in the storage circuit, and an interrogation input connected to be effective to obtain an output at the readout connection and to cause re-storage of the information in such storage circuit. A storage circuit preferably is a bi-stable flip-flop. A dual stage combining means is provided; a first stage of the combining means combines the outputs from the readout connections of the storage circuits of the same weight, to form a composite output; and the second stage of the combining means combines the composite outputs to a single output signal.

Figure 2A:
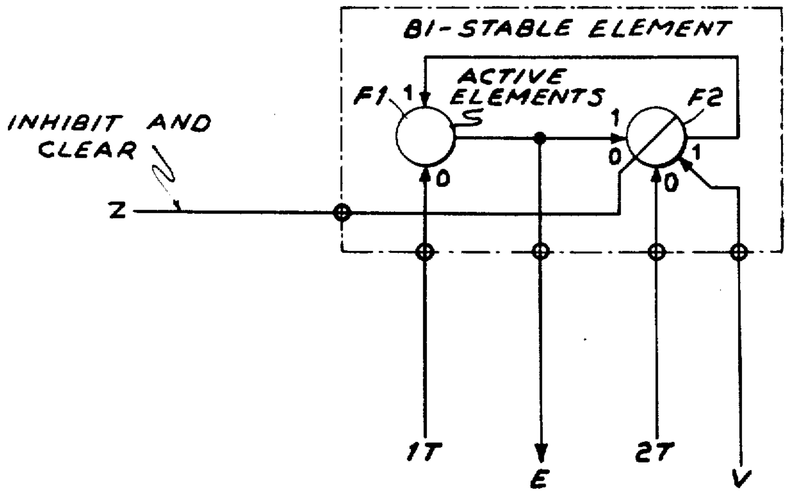
Figure 2B:
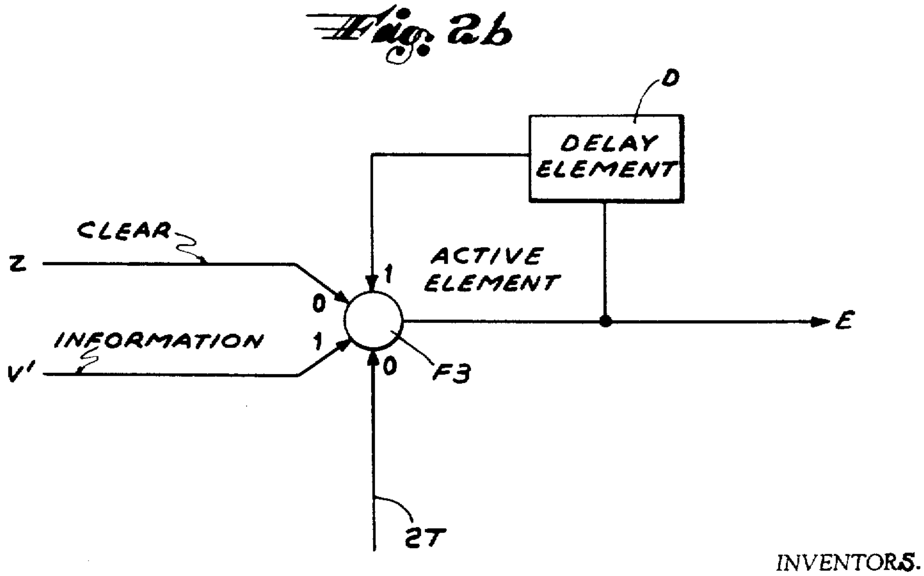

The structure, organization and operation of the invention will now be described more specifically in the following detailed description with reference to the accompanying drawings, in which:

FIGURE 1 illustrates, schematically, a system in two coordinates;

FIGURE 2*a* is a schematic diagram of a bi-stable storage element;

FIGURE 2*b* is a schematic diagram of a mono-stable storage element; and

Figure 3:
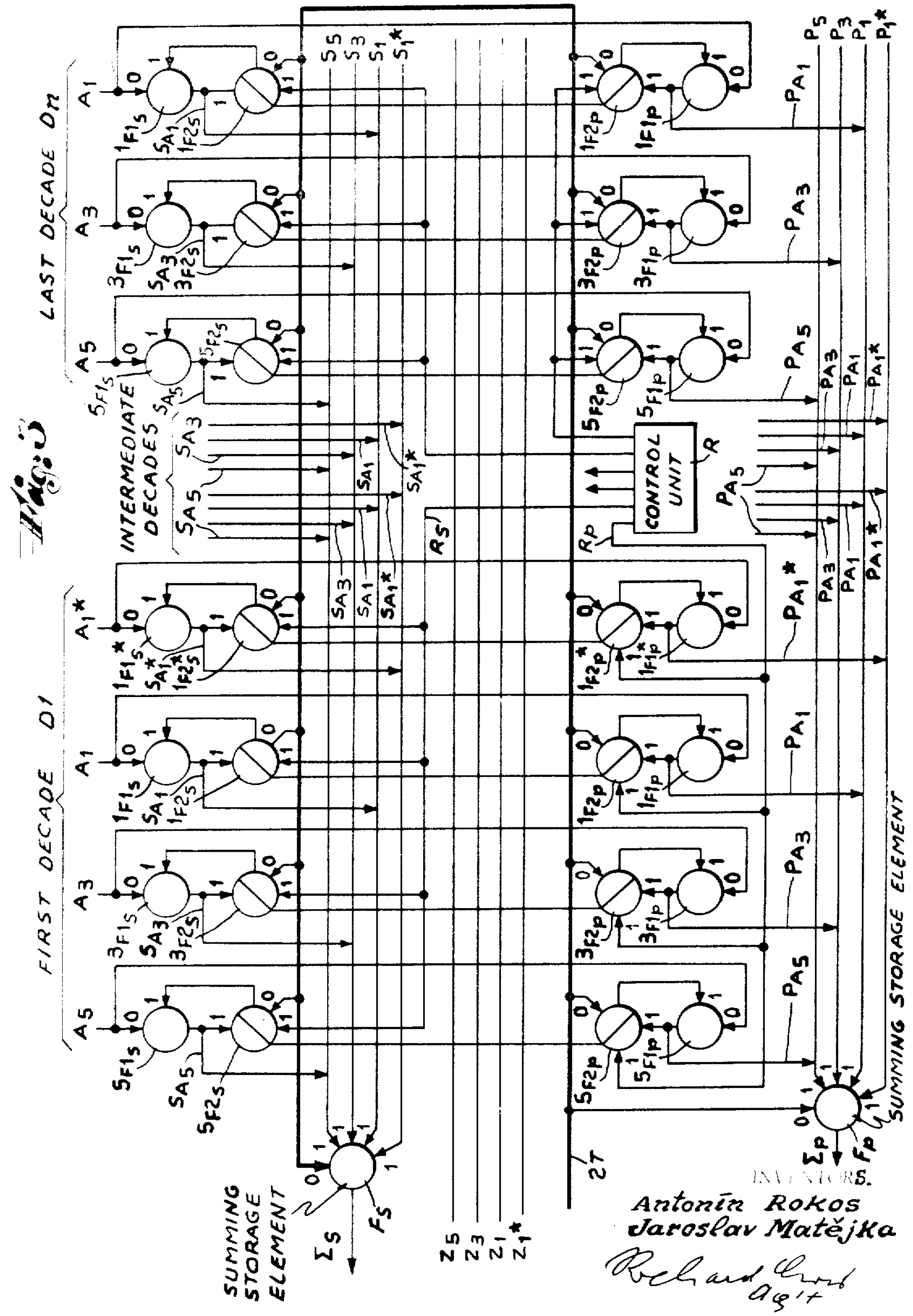

FIGURE 3 is a schematic diagram of a storage system utilizing linear interpolation, for two coordinates, in a decimal system.

Referring now to the drawings:

FIGURE 1 illustrates the principle on which the present invention is based. Let it be assumed that the interpolation stage of the machine uses a decimal counter. D1 represents the first decade of a counter. The decade counts the clock impulses U1 applied at the input, and is so connected, that at each cycle of ten clock impulses, the outputs indicated a $A_5$, $A_2$, $A_1$, $A_1$* form five, two, one, and one pulse respectively; at the tenth pulse, a carry $U_2$ is applied to the next decade D2. Two or three gate systems are connected to the outputs of the decade D1, depending upon the number of coordinates to be controlled. FIGURE 1 illustrates an arrangement in a two coordinate system. Gates $H_{5s}$, $H_{2s}$, $H_{1s}$ and $H_{1s}$* are connected to the respective outputs of the decade D1, and to the summing network $\Sigma_s$. This is the control for the s-coordinate; similarly, gates $H_{5p}$, $H_{2p}$, $H_{1p}$ and $H_{1p}$*, are connected to the same decade D1 and to the summing network $\Sigma_p$, for control of the p-coordinate. The gates themselves are controlled by storage elements $P_{5s}$, . . . $P_{1s}$*, and $P_{5p}$ . . . $P_{1p}$*. The gates are AND-gates; when there is coincidence between a signal from the storage element P, and from the counter, an output will be obtained. It is thus seen, that any one of the gates $H_{5s}$ . . .; $H_{5p}$ . . . passes pulses from the counter only when the coordinate storage element $P_{5s}$ . . . ; $P_{5p}$ . . . contains information which require the passage of these pulses. For example, if the program demands that in each cycle of ten pulses, the outputs marked at $\Sigma_s$ and $\Sigma_p$ have a group of pulses appearing thereon of a ratio of 7 to 3, then an information signal is placed in storage elements $P_{5s}$, $P_{2s}$, as well as $P_{2p}$ and $P_{1p}$. As is well known, any ratio of the number 0–9 can be formed in this manner. The further decades D2, etc., may be similar to the decade illustrated in FIGURE 1. Each gate is controlled by its own storage element, and the outputs of the gates are connected similarly to the summing network $\Sigma_s$ and $\Sigma_p$. Thus, any desired arrangement of numbers with as many decades as required can be obtained. The gates themselves may be formed as is well known by relays, diodes, transistor circuits or the like. Similarly, the storage elements may be relays, electronic, solid state bi-stable or mono-stable circuits, gas discharge tubes or the like.

The logic elements shown in FIGURES 2*a* and 2*b* utilized by the apparatus of the present invention are known in the art and described in various publications, for example, in the book entitled "Design of Transistorized Circuits for Digital Computers," A. I. Pressman; John F. Ryder, Publisher, Inc., New York, 1959. Reference may also be had to U.S. Patent 3,173,001, and British Patent 912,657 which are concerned with machine tool control systems using codes utilizing linear interpolation.

The storage and logic network according to the present invention, which will be used to select impulses with linear interpolation, utilizes flipflop circuits, which, may operate either bi-stably or mono-stably.

Referring now to FIGURE 2*a*:

Two systems of reading pulses 1T and 2T are available, which are so arranged that they do not occur simultaneously and that between two subsequent impulses 1T, at least one pulse of the group 2T occurs. For example, the pulses may occur alternately, although subsequent pulses of the group 2T need not have an intervening pulse of the group, or series, or cycle 1T.

The bi-stable element of FIGURE 2*a* has a pair of active elements, for example, magnetic cores, transistors, or the like labelled F1, F2. Both of the elements F1, F2 are capable of being in either one of a pair of states. Let it be assumed that information is contained within the element F1, by having the element in a predetermined state. A reading pulse of the cycle or series 1T will then have this effect:

(a) Information in F1 is erased.

(b) F1 will have an output at the output line E.

(c) The output on line E also places the information into element F2.

The next pulse, according to the above definition must be a 2T pulse. Upon the occurrence of the 2T pulse, element F2 will have this action:

(a) The information in element F2 is erased.

(b) The feedback line connecting F2 and F1 will cause re-registration of the information in element F1.

The significance of the input line V will be explained below.

In addition, a line Z connected to element F2 is shown. This line inhibits information in F2. If the signal on line Z is long enough, F2 cannot reset F1, and thus the entire information contained within the storage element of FIGURE 2a is erased. Line Z may thus be referred to as a "null" line. If the pulse on line Z is not very long, then merely F2 is cleared. Since the signal on line Z forms a block to other signals to F2, the line is drawn through the circle to schematically show blocking of any outputs.

Line V, connected to element F2, is provided in order to set the element F2 during the occurrence of the cycle or series of pulses 1T. Thus, information can be placed into the memory cell of FIGURE 2*a*, by setting element F2, and transferring this information during the next cycle 2T into element F1.

FIGURE 2*b* shows a single stage storage cell useful in the system of the present invention. Information is regenerated directly by the output signals, by means of a feedback line over a delay element D. Line Z again is an inhibit or cancellation line; line $V^1$ places the information into element F3 of FIGURE 2*b* during the cycle or series of clock pulses 2T. In order to reset this element F3 in its entirety, the null signal on line Z must be of longer duration than the delay in the delay element D.

Referring now to FIGURE 3, which illustrates the entire system, in a two coordinate arrangement:

The interpolation stage has a decade counter. Here, as in FIGURE 1, the various decades have four outputs, similarly to FIGURE 1; the pulses may be in the series of 5, 3, 1 and 1* per cycle of ten impulses. FIGURE 3 only shows a portion of the entire system, namely the portion in connection with the first decade D1 of the counter, and the portion having three outputs of the last decade $D_n$. Intermediate decades have been deleted from the drawing, but their use will be obvious to those skilled in the art. FIGURE 3 shows two summing elements $F_s$ and $F_p$, and a control unit R. Each output of the counter is connected to corresponding storage elements of the coordinates, to read the information simultaneously into all the respective storage networks. The information, and a switching of signals from the output of the counter to the summing circuits (if desired) for the respective coordinate is stored in the storage elements and networks, and thus correspond to the elements P of FIGURE 1. The summing of the output signals is based on the fact that for any particular period of time, only a single output of the counter can have a signal thereon; it is accomplished in two cycles. First, the outputs of similarly identified storage networks which are, in their respective decades, assigned to the same coordinate (for example, all elements having an "*s*" subscript) are connected to one registration bus, so that the entry in the summing storage element $F_s$ can be carried out. Similarly, storage for the coordinate "*p*" is in element $F_p$.

All outputs $A_5$, $A_3$, etc. are connected to storage elements of the respective coordinates "*s*," "*p*"; the outputs $SA_5$ of the decade corresponding to $A_5$ of the "s-coordinate" are connected to a bus $S_5$; this bus is connected in turn to the summing input of element $F_s$. Similarly, the outputs $SA_3$ of all $A_3$ decades and of the same coordinate, are combined in a bus $S_3$, which in turn is connected to element $F_s$. Similarly, other buses $S_1$, $S_1$*, $P_5$, $P_3$, $P_1$ and $P_1$* are connected to elements $F_s$ and $F_p$ respectively. If a third coordinate were to be used, a third, similar system of storage elements, and combining elements similar to $F_s$, $F_p$ would be required.

The heavy line in FIGURE 3 illustrates a bus having a series 2T pulses of the machine applied thereto. Pulses 2T are applied to the inputs of all of the elements having subscripts 2*s* and 2*p*, as well as to the control input of elements $F_s$ and $F_p$. This connection has the following effect:

Information which is contained within any one of the elements having a subscript $1_s$ or $1_p$ is transferred by means of a pulse from the decades, $A_5$, $A_3$, etc. into the elements having the respective subscript 2*s* or 2*p*; simultaneously, it also is placed on the respective bus $S_5$, $S_3$, etc., $P_5$, etc. The subsequent pulse must be, by definition, a 2T pulse. Upon the occurrence of this pulse, information transferred into the element having the 2*s*, 2*p* subscript is erased therein and transferred immediately back into the element having the 1*s*, 1*p* subscript. Simultaneously, the information which was placed by means of the buses $S_5$, $S_3$ . . . $P_5$, $P_3$ . . . into the combining element $F_s$, $F_p$, erases the information within the $F_s$, $F_p$, and transfers the therein contained information for further use in the machine to the outputs $\Sigma_s$, $\Sigma_p$ from the storage elements $F_s$, $F_p$.

The elements having the subscripts 2*s*, 2*p* thus, during the second cycle 2T of the machine are reset constantly to zero. This fact can be utilized advantageously, and without any requirement for additional equipment to enter new information into the storage network.

The information, which in the example has the code 5311*, although other codes may be used, is entered in this manner:

Lines $Z_5$, $Z_3$, $Z_1$ and $Z_1$* are connected as inhibit lines, similarly to the connection of FIGURE 2*a*. The control network R applies SET signals, stepped in time depending upon the particular decade, over its output lines $R_p$, $R_s$ and connected to the various decades, as shown. Upon coincidence of a signal on one of the Z lines, entry of information is inhibited, as has been explained above. Thus, simultaneous occurrence for example of a signal on line $R_p$ from control unit R, and on line $Z_5$, will inhibit information being entered into element $5_{F2p}$, since the $Z_5$ signal inhibits the element $5_{F2p}$ and prevents entry of a signal over line $R_p$ from control unit R. Absence of a null, or inhibit signal on any one of the Z lines during the stepping of control unit R will however enter information over lines $R_p$, $R_s$, and similar lines only schematically indicated on the drawing.

When all the Z lines are energized, and for a sufficiently long period of time, then the entire system is reset to zero or null, since none of the steps, over subsequent decades, of the control unit can enter any information.

The control unit R is provided with a logical switching network which switches the information, step by step from one decade to the next. Such networks are well known in the art and are not specifically indicated in the drawing. The control unit may of course also include supervisory circuits, so that synchronism between the signals on the Z lines and the stepping of the control unit R is assured.

FIGURE 3 clearly shows that the various output lines $R_s$, and $R_p$ of the control unit R are each connected to all four groups of the storage units having the subscripts 2*s*, 2*p* respectively, and of the respective weights 5311*. The various information data are thus entered by the control unit R, stepwise, in the respective elements $5_{F2s}$, $3_{F2s}$, $1_{F2s}$, $1_{F2s}$*; this information is stored within the units F1, F2 of each of the decades and retained until erased by a long signal on the Z lines.

This signal of the control unit R registers the information during the first cycle 1T of the system. During the next impulse, 2T, in the erasing bus, which is applied to all the elements having subscripts 2*s*, 2*p*, the information is reentered or regenerated from the elements having subscripts 2*s*, 2*p* back into the elements with subscripts 1*s*, 1*p*. Subsequent information data may be entered in a similar manner into further four-groups of the storage and logic elements.

The storage system for the selection of impulses with linear interpolation, according to the present invention, permits economical use of electronic components and presents a reliable solution for read-in, storage and readout of data, without loss of information which may cause, in a machine tool, defective output. Circuit elements and active elements are used economically.

The system of the present invention may be used of course also with binary interpolation, and with number series of different weights than those specifically illustrated. The adaptation of this system to systems for example of the 8421, 5421 or other systems will be obvious to those skilled in the art.

The present invention has been described in terms of block diagrams and schematic diagrams. It will be obvious to those skilled in the art that the logic and particular components and elements indicated by the block diagrams and interconnections may be implemented by a variety of well known circuitry. It is therefore thought unnecessary to describe the exact components on a level more detailed than that required for the understanding of those skilled in the art. It is also to be understood that appropriate interlock or buffer circuit paths are to be provided when necessary, in accordance with good design techniques to prevent feedback of signals or undesirable circuit paths which might influence other circuits to respond spuriously and not in accordance with the invention concept. Such buffers and interlock circuits are not shown on the drawings and the detailed description thereof has been omitted in the interest of clarity and brevity. Their proper use will be obvious to those skilled in the art. The "1" and "0" subscripts on the drawing are in accordance with convention, i.e., at a certain instant of time, the relationship of the signal levels indicated may obtain; for example, and referring to FIGURE 2*a*, pulse 1T has just ended and pulse 2T has not yet begun.

We claim:

1. A storage and logic network adapted for connection to a multistage counter, said counter delivering count pulses of predetermined weight during each cycle thereof, said network comprising storage circuits having an input connection to record information signals applied thereto, a non-destructive readout connection to deliver information stored therein, and an interrogation input connection effective to obtain an output at said readout connection and to cause re-storage of said information in said storage circuit; and dual stage combining means comprising a first coincidence stage combining the outputs from the readout connections of said storage circuits of the same weight to form a composite output, and a second coincidence stage combining the composite outputs to a single output signal.

2. A storage and logic network adapted for connection to a multistage counter, said counter delivering count pulses of predetermined weight during each cycle thereof, said network comprising storage circuits having an input connection to record information signals applied thereto, said storage circuits being formed of flipflops having a pair of storage elements, a non-destructive readout connection to deliver information stored therein, and an interrogation input connection effective to obtain an output at said readout connection and to cause re-storage of said information in said storage circuit; cyclic clock means operable in two discrete operating cycles; means connecting said cyclic clock means to a first storage element during a first operating cycle to transfer information to said readout connection and simultaneously to said second element; means connecting said cyclic clock means to said second storage element of said flipflops during said second cycle to transfer information therein back into said first element and simultaneously erase information stored in said second element; and dual stage combining means comprising a first stage combining the outputs from the readout connections of said storage circuits of the same weight to form a composite output, and a second stage combining the composite outputs to a single output signal.

3. Storage and logic network as claimed in claim 2 wherein said cyclic clock means, during said second cycle, are connected to said interrogation input to obtain said readout and simultaneously cause re-storage of the information originally in said first element of said flipflop.

4. Storage and logic network as claimed in claim 2 wherein said flipflops are arranged in a matrix.

5. Storage and logic network as claimed in claim 2 including a "clear" signal source; and a source of stepping control pulses, said flipflops being arranged in a matrix having rows and columns; and connection means from said "clear" signal source to said rows and connection means from said stepping control pulse source to said columns to enter in information into said flipflops by selective, simultaneous application, or absence of "clear" signals during stepping of said stepping source.

6. Storage and logic network as claimed in claim 5 wherein said "clear" signal source and said stepping control source are connected to one of said elements.

7. Storage and logic network as claimed in claim 6 wherein said one connected element is said second element of said pair to enter information into said flipflops during the second cycle of said cyclical clock means and transfer information for storage and readout during the next subsequent first cycle of said cyclical clock means.

8. Storage and logic network as claimed in claim 2 including a "clear" input connected to said flipflops, and means applying pulses to said "clear" input of sufficient length to prevent re-storage of information cleared from one of said elements into the other.

9. In a machine tool control system having cyclically operating decade counters in which the stages of each output provides pulses of predetermined density; a bicyclically operating storage and summing circuit; means providing "clear" pulses in two cycles; said storage and summing circuit including a plurality of flipflops arranged in a matrix, said flipflops each having a pair of elements; clock-enabled combining circuit means; means applying clock pulses of one cycle to one of said elements in a row, said elements being connected to provide output pulses to said combining circuit means and simultaneously store said information in said second element of said pair; and means applying clock pulses of the second cycle to all the other of said elements of said pair and to said combining circuit means to sum information contained in said flipflops in said combining circuit; said flipflops being arranged to transfer information from said second of said pair of elements back to said first of said pair of elements whereby the information is re-registered for subsequent readout upon the next cycle.

10. A machine tool control system as claimed in claim 9 including a plurality of "clear" connections to said flipflops, said connections being grouped according to like pulse density of the several decades; a control network simultaneously enabling all said flipflops of any one decade and sequentially enabling sequential decades; a means applying selectively "clear" pulses to said "clear" connections timed in accordance with the sequential operation of said control network to enter information only upon simultaneous presence of an enabling input from said control network and absence of a "clear" input to said "clear" connection.

References Cited

UNITED STATES PATENTS

| | | | |
|---|---|---|---|
| 3,305,843 | 2/1967 | Scuitto | 340—172.5 |
| 3,267,460 | 8/1966 | Merrell et al. | 340—172.5 |

ROBERT C. BAILEY, *Primary Examiner.*

G. D. SHAW, *Assistant Examiner.*